United States Patent
Shimada et al.

(10) Patent No.: US 9,008,936 B2
(45) Date of Patent: Apr. 14, 2015

(54) VEHICLE CONTROL APPARATUS

(75) Inventors: Hiroshi Shimada, Tajimi (JP); Masashi Takagi, Nagoya (JP); Akihiro Kida, Toyota (JP); Michihito Shimada, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/127,560

(22) PCT Filed: Jun. 30, 2011

(86) PCT No.: PCT/JP2011/065043
§ 371 (c)(1),
(2), (4) Date: Dec. 19, 2013

(87) PCT Pub. No.: WO2013/001637
PCT Pub. Date: Jan. 3, 2013

(65) Prior Publication Data
US 2014/0129049 A1    May 8, 2014

(51) Int. Cl.
*F02D 29/02*    (2006.01)
*F02D 11/10*    (2006.01)
*B60T 7/00*    (2006.01)
*B60T 7/02*    (2006.01)
*B60T 7/04*    (2006.01)
*F02D 41/02*    (2006.01)

(52) U.S. Cl.
CPC ............ *F02D 29/02* (2013.01); *B60T 7/042* (2013.01); *F02D 41/021* (2013.01); *F02D 11/107* (2013.01); *F02D 2200/602* (2013.01); *F02D 2250/26* (2013.01)

(58) Field of Classification Search
None
See application file for complete search history.

(56) References Cited

U.S. PATENT DOCUMENTS

| | | | |
|---|---|---|---|
| 6,120,414 A * | 9/2000 | Endo et al. .................... | 477/185 |
| 6,401,024 B1 | 6/2002 | Tange et al. | |
| 8,554,419 B2 * | 10/2013 | Crombez et al. ............... | 701/48 |
| 2004/0227397 A1 | 11/2004 | Kusano | |
| 2009/0063000 A1 | 3/2009 | Kodama et al. | |
| 2010/0036566 A1 | 2/2010 | Hayami | |
| 2010/0228458 A1 | 9/2010 | Bach et al. | |

FOREIGN PATENT DOCUMENTS

| | | |
|---|---|---|
| DE | 102007023929 A1 | 11/2008 |
| EP | 1060938 A2 | 12/2000 |
| JP | 2010-038051 A | 2/2010 |

OTHER PUBLICATIONS

International Search Report of PCT/JP2011/065043 dated Sep. 13, 2011.

* cited by examiner

*Primary Examiner* — Michael J Zanelli
(74) *Attorney, Agent, or Firm* — Sughrue Mion, PLLC

(57) ABSTRACT

A brake override system detects a brake operation based on master cylinder pressure when the brake operation followed by an accelerator operation results in simultaneous performance of the accelerator operation and the brake operation. The brake override system detects the brake operation by a brake switch when the accelerator operation followed by the brake operation results in the simultaneous performance of the accelerator operation and the brake operation. Thus, the system may accurately detect the brake operation regardless of the order of the accelerator operation and the brake operation.

3 Claims, 4 Drawing Sheets

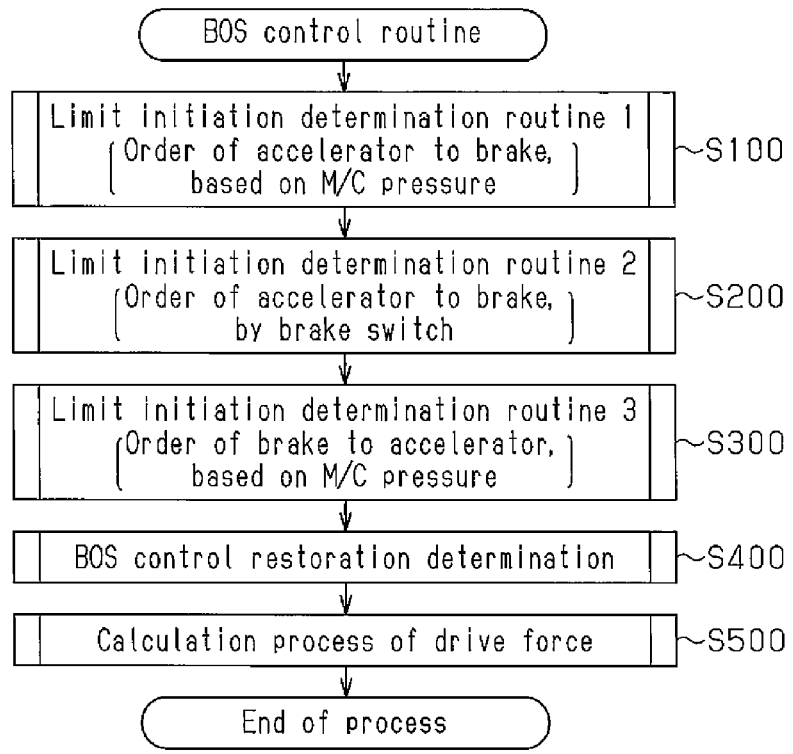
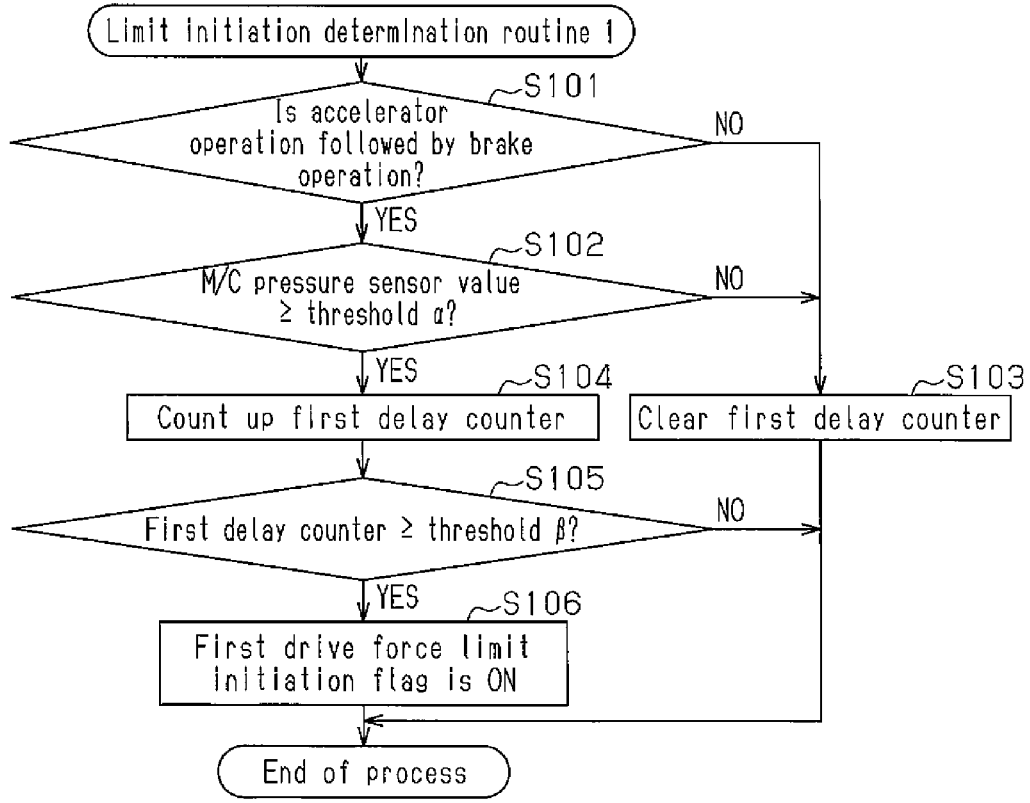

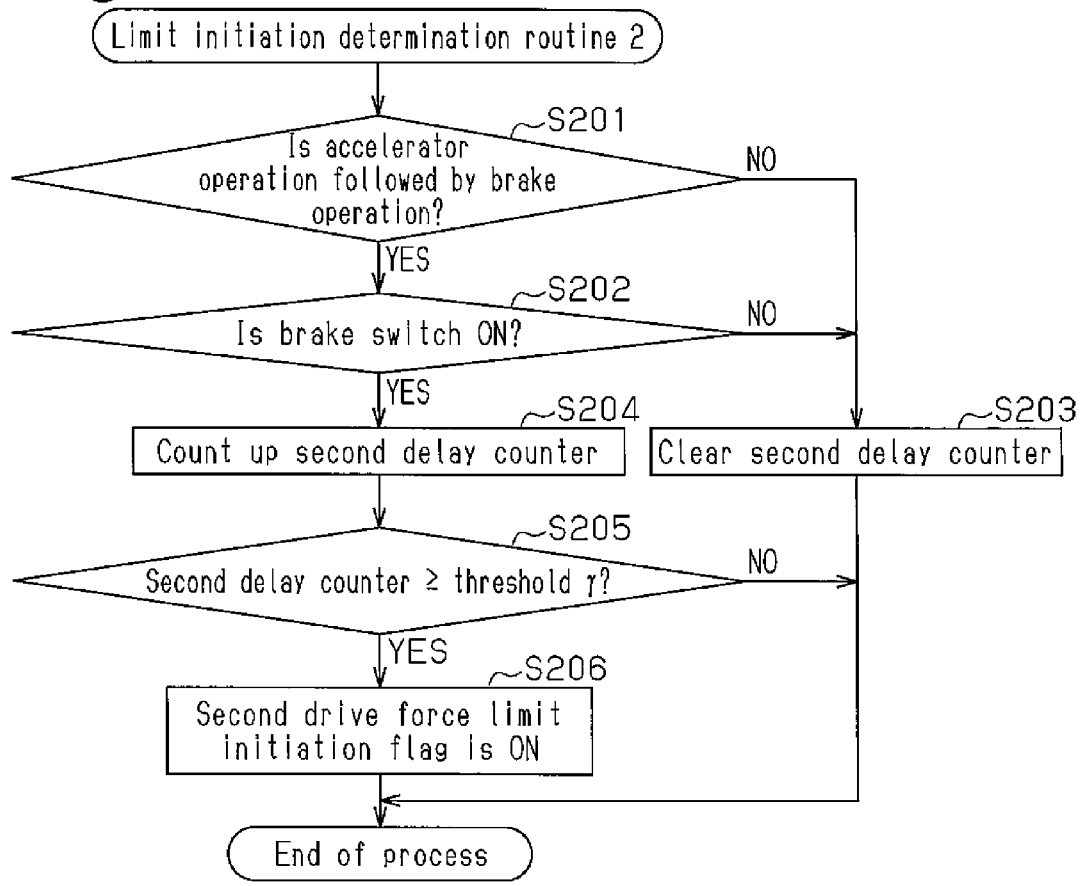

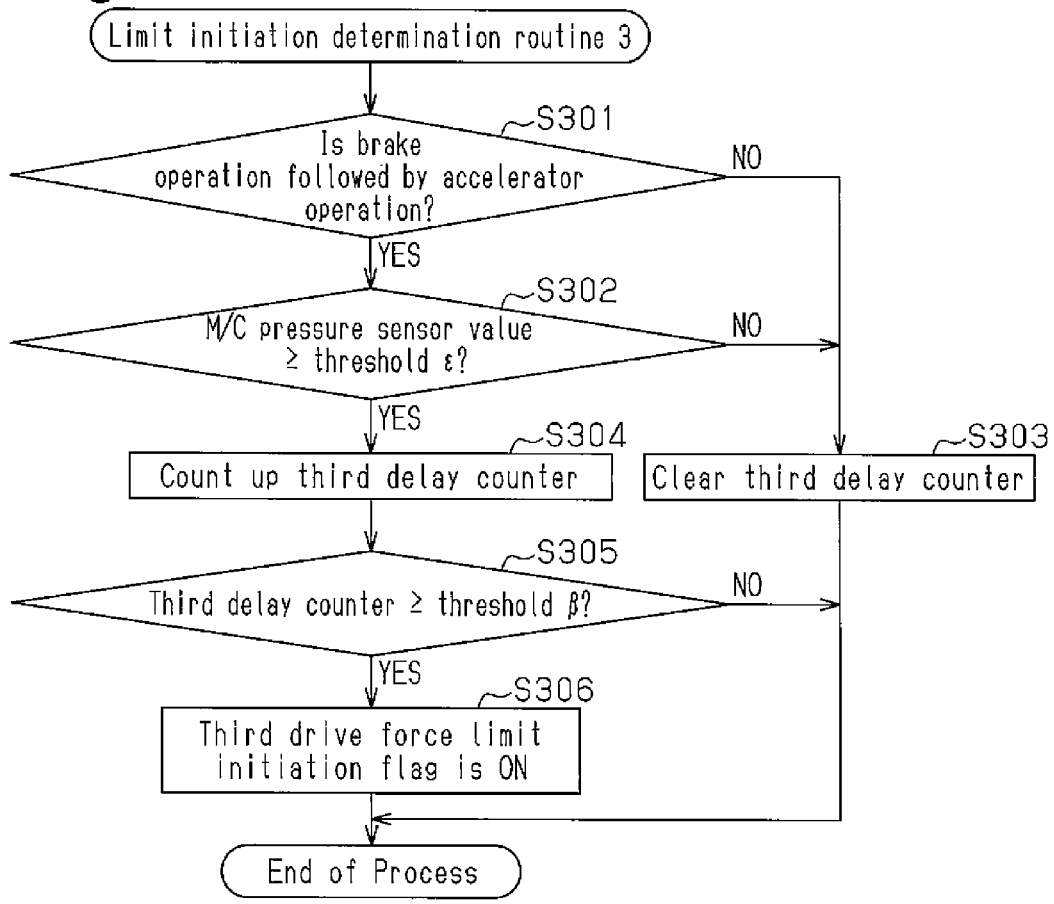
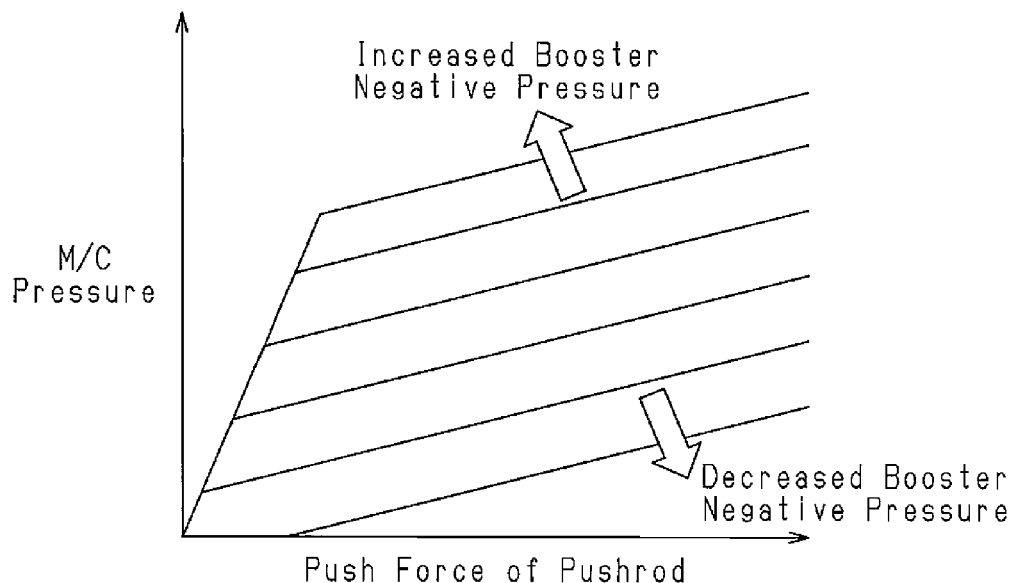

VEHICLE CONTROL APPARATUS

CROSS REFERENCE TO RELATED APPLICATIONS

This is a National Stage of International Application No. PCT/JP2011/065043 filed Jun. 30, 2011, the content of all of which is incorporated herein by reference in its entirety.

TECHNICAL FIELD

The present invention relates to a vehicle control apparatus that limits drive force of a vehicle when an accelerator operation and a brake operation are simultaneously performed.

BACKGROUND ART

In recent years, a brake override system (BOS), which prioritizes a brake operation when an accelerator operation and the brake operation are simultaneously performed, has been adopted as a control mechanism for a vehicle. The BOS limits drive force of a vehicle, for example, by decreasing the amount of opening of the throttle to a value less than the opening amount corresponding to the actual amount of the accelerator operation to reduce the engine output upon detection of simultaneous performance of the accelerator operation and the brake operation.

Meanwhile, depression force on a brake pedal is conveyed to a master cylinder. The master cylinder includes pistons, which are moved by the depressing force on the brake pedal. The movement of the pistons generates hydraulic pressure (master cylinder pressure) for actuating a braking system. A brake booster arranged between the brake pedal and the master cylinder boosts depression force on the brake pedal by intake negative pressure of the engine, and conveys the force to the master cylinder.

Patent Document 1 describes a vehicle control apparatus that calculates depression force on a brake pedal from master cylinder pressure and negative pressure of a brake booster, and utilizes the calculated force on the brake pedal as brake information.

PRIOR ART DOCUMENTS

Patent Documents

Patent Document 1: Japanese Laid-Open Patent Publication No. 2010-038051

SUMMARY OF THE INVENTION

Problems that the Invention is to Solve

When the accelerator pedal remains pressed prior to a brake operation, the intake negative pressure remains decreased. When the brake operation is repeated in this state, negative pressure also is decreased in the brake booster. With the decreased negative pressure in the brake booster, the brake booster does not effectively boost depression force on the brake pedal and thus the master cylinder pressure is decreased. FIG. 6 shows the way in which a relationship between push force of a pushrod of the master cylinder and master cylinder pressure is changed in accordance with the negative pressure of the brake booster.

As illustrated in the graph, when the negative pressure has been decreased in the brake booster upon the brake operation, it is difficult to raise the master cylinder pressure. The brake operation may result in simultaneous performance of an accelerator operation and the brake operation after a brake operation is repeated while keeping the accelerator pedal pressed. That lowers accuracy in detection of the brake operation based on master cylinder pressure. Consequently, the simultaneous performance of the accelerator operation and the brake operation cannot be detected accurately.

Accordingly, it is an objective of the present invention to provide a vehicle control apparatus that more accurately detects a brake operation, and adequately reduces drive force of the vehicle in response to simultaneous performance of an accelerator operation and the brake operation.

Means for Solving the Problems

To achieve the above objective, a vehicle control apparatus of the present invention limits drive force of a vehicle upon simultaneous performance of an accelerator operation and a brake operation. The vehicle control apparatus uses different methods for detecting the brake operation according to whether the simultaneous performance has resulted from the accelerator operation followed by the brake operation or the brake operation followed by the accelerator operation.

As mentioned above, even if the brake operation is accurately detected when the accelerator operation and the brake operation are performed in the order of the brake operation followed by the accelerator operation, the detection might not be accurate when the accelerator operation and the brake operation are performed in the order of the accelerator operation followed by the brake operation. In that case, by altering a method for detecting the brake operation according to whether the brake operation is subsequent or preceding to the accelerator operation, it might be possible to accurately detect the brake operation in either order. Therefore, the above configuration ensures detection of the brake operation, and appropriately reduces drive force of the vehicle in response to the simultaneous performance of the accelerator operation and the brake operation.

In particular, the following configuration provides more accurate detection of the brake operation. The brake operation is detected by a brake switch when the accelerator operation followed by the brake operation results in the simultaneous performance. The brake operation is detected based on master cylinder pressure when the brake operation followed by the accelerator operation results in the simultaneous performance. This configuration enables accurate detection of the brake operation even if it is difficult to raise the master cylinder pressure due to a continuous accelerator operation prior to the brake operation.

In addition, the following configuration provides more accurate detection of the brake operation. First, detection by a brake switch and detection based on master cylinder pressure are both performed to detect the brake operation when the accelerator operation followed by the brake operation results in the simultaneous performance. Only the detection based on the master cylinder pressure is performed to detect the brake operation when the brake operation followed by the accelerator operation results in the simultaneous performance. The brake switch detects the brake operation even if negative pressure is decreased in the brake booster and it is difficult to raise the master cylinder pressure due to a continuous accelerator operation prior to the brake operation. Thus, this configuration enables accurate detection of the brake operation.

BRIEF DESCRIPTION OF THE DRAWINGS

FIG. 2 is a flowchart showing the procedure for processing a BOS control routine employed in the present embodiment;

FIG. 3 is a flowchart of a limit initiation determination routine 1 employed in the present embodiment;

FIG. 4 is a flowchart of a limit initiation determination routine 2 employed in the present embodiment;

FIG. 5 is a flowchart of a limit initiation determination routine 3 employed in the present embodiment; and FIG. 6 is a graph showing changes in a relationship between push force of the pushrod of the master cylinder and master cylinder pressure caused by negative pressure of the brake booster.

MODES FOR CARRYING OUT THE INVENTION

Figure 1:
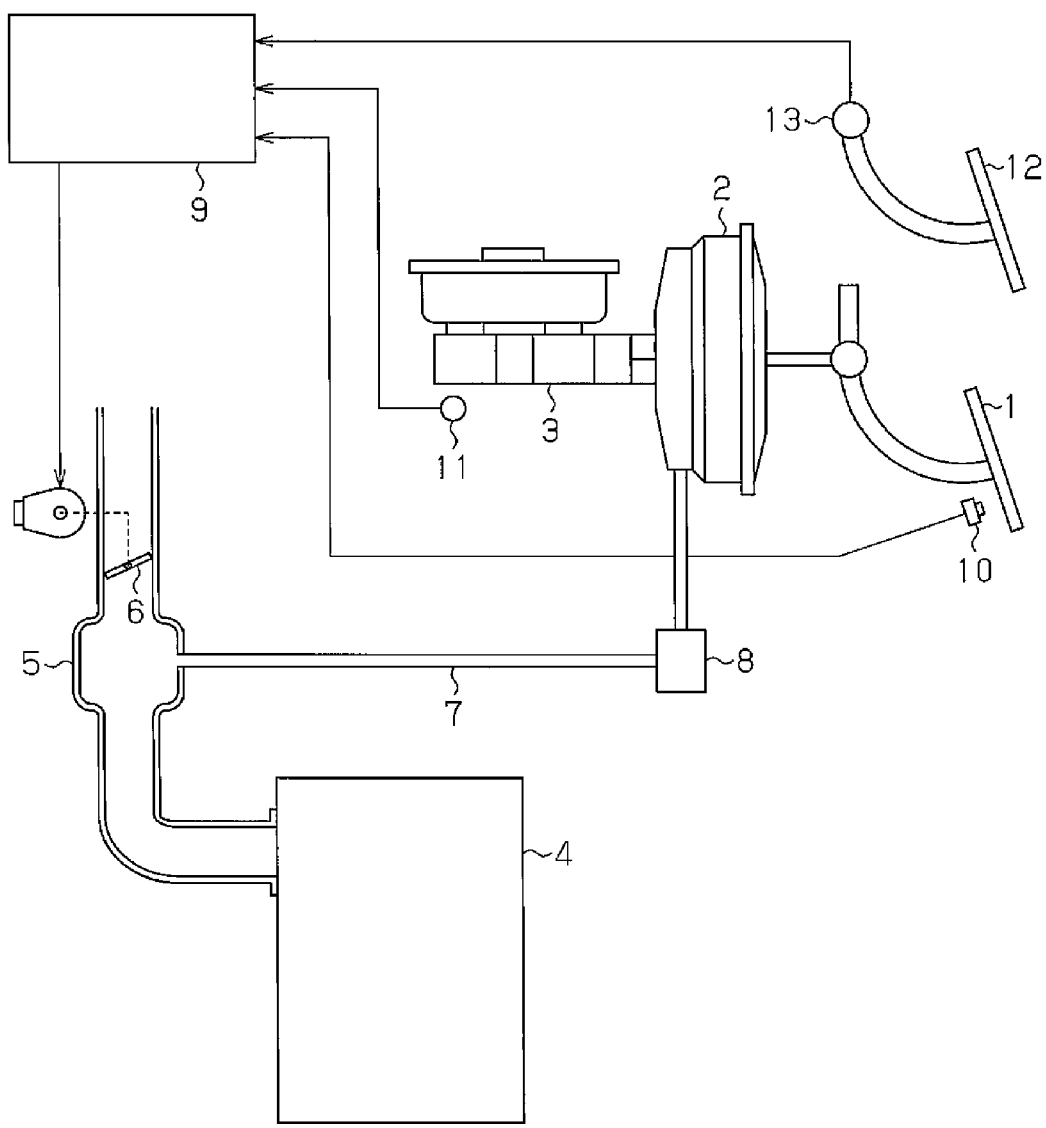
FIG. 1 is a schematic block diagram entirely showing the structure of a vehicle control apparatus according to a first embodiment of the present invention.

A vehicle control apparatus according to a first embodiment of the present invention will be described in detail with reference to FIGS. 1 to 6.

As shown in FIG. 1, a brake booster 2 conveys force applied on a brake pedal (brake operation member) 1 to a master cylinder 3. The brake booster 2 boosts depression force on the brake pedal 1 using intake negative pressure of an engine 4, and conveys the force to the master cylinder 3. The master cylinder 3 moves pistons with the conveyed force, and generates master cylinder pressure (hereinafter, M/C pressure), which is hydraulic pressure, to activate a braking system.

A negative pressure pipe 7 connects the brake booster 2 to an intake manifold 5 of the engine 4. A check valve 8, which is arranged at the middle of the negative pressure pipe 7, allows air to flow from the brake booster 2 to the intake manifold 5, and prohibits air-flow in the opposite direction. The negative pressure pipe 7 introduces intake negative pressure generated at the downstream side of the throttle valve 6 to the brake booster 2.

The vehicle includes a brake override system (hereinafter, BOS) 9, which prioritizes a brake operation upon simultaneous performance of an accelerator operation and the brake operation. The BOS 9 functions as a detection unit, which detects the accelerator operation and the brake operation, as well as a control unit. The BOS 9 is connected to a brake switch 10, which is turned on when the brake pedal 1 is depressed by more than a certain amount. The BOS 9 receives input of a detection signal from an M/C pressure sensor 11, which detects master cylinder pressure, and a detection signal from an accelerator pedal position sensor 13, which detects the degree of application of an accelerator pedal (accelerator operation member) 12. The BOS 9 limits drive force of the vehicle by decreasing the amount of opening of the throttle valve 6 to a value less than the opening amount corresponding to the actual position of the accelerator pedal 12 to reduce the output of the engine 4 when detecting simultaneous performance of the accelerator operation and the brake operation.

In this way, the BOS 9 limits drive force upon the simultaneous performance of the accelerator operation and the brake operation, and the BOS control is executed by a BOS control routine shown in FIG. 2. The BOS 9 repeatedly executes the routine at predetermined control periods.

When the routine starts the process, step S100 executes the limit initiation determination routine 1 to determine whether to initiate limit of drive force based on the M/C pressure when the accelerator operation and the brake operation are performed in the order of the accelerator operation followed by the brake operation. Step S200 executes the limit initiation determination routine 2 to determine whether to initiate limit of drive force by the brake switch 10 when the accelerator operation and the brake operation are performed in the order of the accelerator operation followed by the brake operation. Step S300 executes the limit initiation determination routine 3 to determine whether to initiate limit of drive force based on the M/C pressure when the accelerator operation and the brake operation are performed in the order of the brake operation followed by the accelerator operation. These limit initiation determination routines 1-3 determine whether the simultaneous performance of the accelerator operation and the brake operation has been detected. Upon detection of the simultaneous performance, a drive force limit initiation flag is set on.

Step S400 determines whether to restore the limited drive force of the vehicle in response to cancellation of the simultaneous performance of the accelerator operation and the brake operation. Step S500 calculates drive force of the vehicle. In this calculation, drive force is derived in order to limit the drive force in response to the simultaneous performance of the accelerator operation and the brake operation when the drive force limit initiation flag has been set on in any one of the limit initiation determination routines 1-3. After the drive force limit initiation flag is turned off from on, the drive force is derived in order to gradually restore the limited drive force to the original. After the calculation of drive force, the routine finishes the process.

Referring to FIG. 3, the procedure of the limit initiation determination routine 1, at the step S100 of the BOS control routine, will be described in detail.

When the routine starts the process, step S101 verifies whether the accelerator operation and the brake operation have been performed in the order of the accelerator operation followed by the brake operation. When the accelerator operation and the brake operation have not been performed in the order of the accelerator operation followed by the brake operation (S101: NO), step S103 clears the value of a first delay counter, and the routine finishes the process.

When the accelerator operation and the brake operation have been performed in the order of the accelerator operation followed by the brake operation (S101: YES), step S102 verifies whether a sensor value of M/C pressure is greater than or equal to a defined threshold α. When the sensor value of M/C pressure is less than the threshold α (S102: NO), step S103 clears the value of the first delay counter, and the routine finishes the process.

When the sensor value of the M/C pressure is greater than or equal to the threshold α (S102: YES), step S104 counts up the first delay counter. Then, step S105 verifies whether the value of the first delay counter is greater than or equal to a defined threshold β. When the value of the first delay counter is less than the threshold β (S105: NO), the routine directly finishes the process. When the value of the first delay counter is greater than or equal to the threshold β (S105: YES), step S106 sets a first drive force limit initiation flag on, and the routine finishes the process.

In this way, the limit initiation determination routine 1 detects a brake operation based on the sensor value of M/C pressure when the accelerator operation and the brake operation are performed in the order of the accelerator operation followed by the brake operation. When detecting a valid brake operation based on the sensor value of M/C pressure, the first drive force limit initiation flag is set on to request for limit of drive force.

Referring to FIG. 4, the procedure of the limit initiation determination routine 2, at the step S200 of the BOS control routine, will be described in detail.

When the routine starts the process, step S201 verifies whether the accelerator operation and the brake operation have been performed in the order of the accelerator operation followed by the brake operation. When the accelerator operation and the brake operation have not been operated in the order of the accelerator operation followed by the brake operation (S201: NO), step S203 clears a value of a second delay counter, and the routine finishes the process.

When the accelerator operation and the brake operation have been performed in the order of the accelerator operation followed by the brake operation (S201: YES), step S202 verifies whether the brake switch 10 is on. When the brake switch 10 is not on (S202: NO), step S203 clears the value of the second delay counter, and the routine finishes the process.

When the brake switch 10 is on (S202: YES), step S204 counts up the second delay counter. Then, step S205 verifies whether the value of the second delay counter is greater than or equal to a defined threshold γ. When the value of the second delay counter is less than the threshold γ (S205: NO), the routine directly finishes the process. When the value of the second delay counter is greater than or equal to the threshold γ (S205: YES), step S206 sets a second drive force limit initiation flag on, and the routine finishes the process.

In this way, the limit initiation determination routine 2 detects a valid brake operation by the brake switch 10 when the accelerator operation and the brake operation are performed in the order of the accelerator operation followed by the brake operation. When detecting the valid brake operation by the brake switch 10, the second drive force limit initiation flag is set on to request for limit of drive force.

Referring to FIG. 5, the procedure of the limit initiation determination routine 3, at the step S300 of the BOS control routine, will be described in detail.

When the routine starts the process, step S301 verifies whether the accelerator operation and the brake operation have been performed in the order of the brake operation followed by the accelerator operation. When the accelerator operation and the brake operation have not been performed in the order of the brake operation followed by the accelerator operation (S301: NO), step S303 clears a value of a third delay counter, and the routine finishes the process.

When the accelerator operation and the brake operation have been performed in the order of the brake operation followed by the accelerator operation (S301: YES), step S302 verifies whether the sensor value of the M/C pressure is greater than or equal to a defined threshold ε. When the sensor value of the M/C pressure is less than the threshold ε (S302: NO), step S303 clears the value of the third delay counter, and the routine finishes the process.

When the sensor value of the M/C pressure is greater than or equal to the threshold ε (S302: YES), step S304 counts up the third delay counter. Then, step S305 verifies whether the value of the third delay counter is greater than or equal to the defined threshold β. When the value of the third delay counter is less than the threshold β (S305: NO), the routine directly finishes the process. When the value of the third delay counter is greater than or equal to the threshold β (S305: YES), step S306 sets a third drive force limit initiation flag on, and the routine finishes the process.

In this way, the limit initiation determination routine 3 detects a valid brake operation based on the sensor value of M/C pressure when the accelerator operation and the brake operation are performed in the order of the brake operation followed by the accelerator operation. When detecting the valid brake operation based on the sensor value of M/C pressure, the third drive force limit initiation flag is set on to request for limit of drive force.

According to the present embodiment as above, operation of the vehicle control apparatus will be described.

In the present embodiment, when the accelerator operation and the brake operation are performed in the order of the brake operation followed by the accelerator operation, the brake operation is detected based on the sensor value of M/C pressure in order to detect simultaneous performance of the accelerator operation and the brake operation. In contrast, when the accelerator operation and the brake operation are performed in the order of the accelerator operation followed by the brake operation, the brake operation is detected by the brake switch 10 in parallel to detection based on the sensor value of the M/C pressure.

If the accelerator pedal 12 remains pressed prior to the brake operation, negative pressure is decreased in the brake booster 2. If the negative pressure of the brake booster 2 is decreased, the brake booster 2 does not effectively boost force applied on the brake pedal 1 and thus the M/C pressure is decreased. Thus, it is difficult to raise the M/C pressure even if the brake pedal 1 is depressed. Consequently, it becomes difficult to detect the brake operation based on the sensor value of the M/C pressure. Even in the case, the present embodiment concurrently detects the brake operation by the brake switch 10. Thus, the present embodiment accurately detects a brake operation even when negative pressure is decreased in the brake booster 2 to hamper accurate detection of the brake operation based on the sensor value of the M/C pressure.

The present embodiment described above provides the following advantages.

(1) In the present embodiment, detection by the brake switch 10 and detection based on the sensor value of the M/C pressure are both performed to detect the brake operation when the accelerator operation followed by the brake operation results in simultaneous performance of the accelerator operation and the brake operation. The present embodiment performs only detection based on the sensor value of the M/C pressure to detect the brake operation when the brake operation followed by the accelerator operation results in the simultaneous performance of the accelerator operation and the brake operation. Thus, the brake switch 10 is capable of detecting the brake operation even when detection based on the sensor value of the M/C pressure is not accurate to detect the brake operation due to keeping the accelerator pedal 12 pressed prior to the brake operation. Therefore, the present embodiment accurately detects the brake operation, and adequately reduces drive force of the vehicle in response to the simultaneous performance of the accelerator operation and the brake operation.

The above embodiment may be modified as below.

In the above embodiment, detection by the brake switch 10 and detection based on master cylinder pressure are both performed to detect the brake operation when the accelerator operation followed by the brake operation results in simultaneous performance of the accelerator operation and the brake operation. However, if accurate detection of the brake operation based on the master cylinder pressure is determined impossible when the accelerator operation and the brake operation are operated in the order of the accelerator operation followed by the brake operation, only the brake switch 10 may detect the brake operation at this time.

The above embodiment detects the brake operation by the brake switch 10 when the accelerator operation and the brake operation are performed in the order of the accelerator operation followed by the brake operation, and it detects the brake operation based on the sensor value of the M/C pressure when the accelerator operation and the brake operation are performed in the order of the brake operation followed by the accelerator operation. However, other methods may be employed to detect the brake operation according to the condition. Even if a certain method allows accurate detection of the brake operation when the accelerator operation and the brake operation are performed in the order of the accelerator operation followed by the brake operation, the same method does not necessarily enable accurate detection of the brake operation when the accelerator operation and the brake operation are performed in the order of the brake operation followed by the accelerator operation. In that case, a different method may sometimes provide accurate detection of the brake operation when the accelerator operation and the brake operation are operated in the order of the brake operation followed by the accelerator operation. One method might not provide accurate detection of the brake operation in both conditions when the accelerator operation and the brake operation are performed in the order of the accelerator operation followed by the brake operation and when the accelerator operation and the brake operation are performed in the order of the brake operation followed by the accelerator operation. However, accurate detection of the brake operation is possible in both conditions by altering a detection method according to the order of operations.

DESCRIPTION OF THE REFERENCE NUMERALS

1: brake pedal, 2: brake booster, 3: master cylinder, 4: engine, 5: intake manifold, 6: throttle valve, 7: negative pressure pipe, 8: check valve, 9: brake override system (BOS), 10: brake switch, 11: M/C pressure sensor, 12: accelerator pedal, and 13: accelerator pedal position sensor.

The invention claimed is:

1. A vehicle control apparatus that limits drive force of a vehicle upon simultaneous performance of an accelerator operation and a brake operation,
    wherein the vehicle control apparatus is configured to use different methods for detecting the brake operation according to whether the simultaneous performance has resulted from the accelerator operation followed by the brake operation or from the brake operation followed by the accelerator operation.

2. The vehicle control apparatus according to claim 1, wherein
    the brake operation is detected by a brake switch when the accelerator operation followed by the brake operation results in the simultaneous performance, and
    the brake operation is detected based on master cylinder pressure when the brake operation followed by the accelerator operation results in the simultaneous performance.

3. The vehicle control apparatus according to claim 1, wherein
    detection by a brake switch and detection based on master cylinder pressure are both performed to detect the brake operation when the accelerator operation followed by the brake operation results in the simultaneous performance, and
    only the detection based on the master cylinder pressure is performed to detect the brake operation when the brake operation followed by the accelerator operation results in the simultaneous performance.

* * * * *